Oct. 27, 1964   F. W. R. STARP ETAL   3,153,998
PHOTOGRAPHIC SHUTTER
Filed Sept. 24, 1962   2 Sheets-Sheet 1

INVENTORS
Franz W. R. Starp
Erwin Weller
Wolfgang A. Erhard
BY Arthur A. March
ATTORNEY

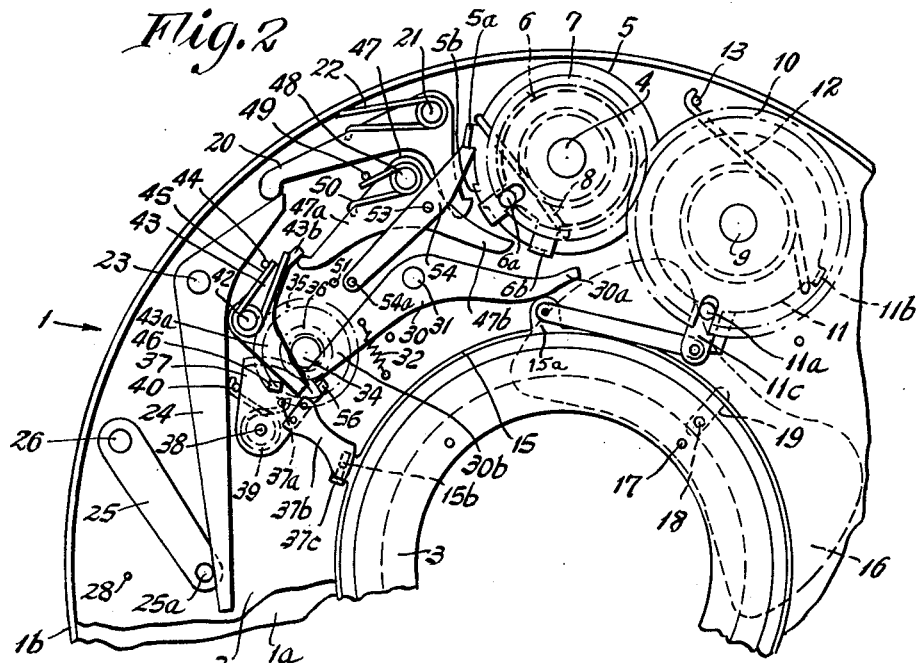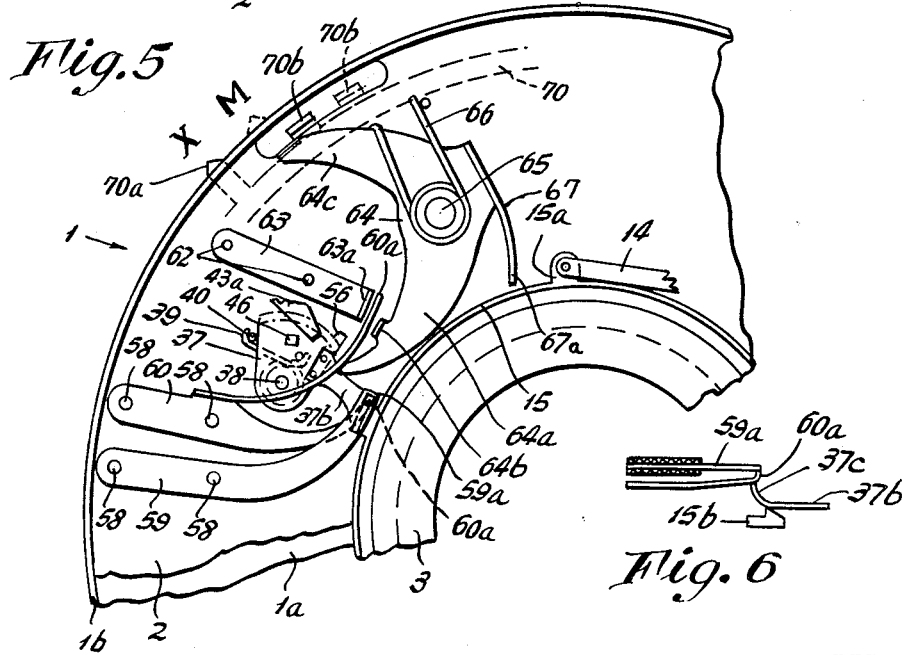

United States Patent Office 3,153,998
Patented Oct. 27, 1964

3,153,998
PHOTOGRAPHIC SHUTTER
Franz W. R. Starp, Erwin Weller, and Wolfgang A. Erhard, Calmbach (Enz), Germany, assignors to Alfred Gauthier, G.m.b.H., Calmbach (Enz), Germany, a corporation of Germany
Filed Sept. 24, 1962, Ser. No. 225,521
Claims priority, application Germany, Oct. 6, 1961
10 Claims. (Cl. 95—63)

The present invention relates to photographic shutters and particularly to shutters of the type having a drive member which can be driven optionally by a mainspring alone or by the latter and an additional spring together.

The problem, which this invention is intended to solve, is to make a shutter of the above-mentioned type with the lowest possible structural expense and the maximum dependability in operation and in such fashion that the actuation or release of certain mechanisms which influence the exposure can be brought about automatically and at the proper moment before the actual running-down of the shutter.

In accordance with the present invention the additional spring is completely cocked, together with the mainspring upon the cocking of the shutter independently of the shutter-speed setting, by means of a movable part bearing a stop or abutment for the additional spring is moved into the position corresponding to the greatest tension of the additional spring, and held fast there, while before release of the drive member, the retention of the movable part of the additional spring is released and a partial or complete relaxation of the additional spring takes place, as determined by a catch connected with the exposure-time setting member so that the main and additional spring can act jointly on the drive member only when the step on the movable part strikes the catch before complete relaxation of the additional spring.

Further in accordance with the present invention, the shutter may include an actuating mechanism which can be cocked before the running down of the shutter and held fast in its cocked position by a holding device that is so associated with the drive mechanism, which comprises the mainspring, the additional spring, and the stop, that the stop, which cooperates with the additional spring, after it has been released, releases the holding device of the transport mechanism which, in its turn, at the end of its own running down movement, releases the shutter drive by the actuating of a lock.

In this way in a shutter arrangement of the above-mentioned type, there is obtained the assurance for a dependable control, precisely adapted in time to the entire running down of the shutter, of a device which influences the exposure, for instance a flash gun, a spring diaphragm, or a swingable mirror installed in the camera. Regardless of whether the drive member of the shutter receives its drive solely from the mainspring or from the latter together with the additional spring, the release or actuation of the corresponding device by the actuating mechanism always takes place at a time which is favorably associated with the commencement of the exposure by the camera.

In order to make the operation of a camera equipped with the shutter of the invention as simple as possible, and to impart maximum dependability to the camera, it is also proposed in accordance with the invention to provide means which, upon the cocking of the shutter, bring not only the mainspring and additional spring but also the spring of the actuating mechanism into cocked position. In a shutter with swing-through shutter blades, a particularly dependable arrangement of uncomplicated construction can be obtained by providing the shutter blade drive ring connected with the driving mechanism via a connecting rod, with a driver which moves upon the cocking of the shutter and while simultaneously driving along with it an arm of the actuating mechanism, brings the latter into cocked position against the action of its drive spring.

A particularly simple and economical manner of cooperation between drive mechanism and actuating mechanism can be obtained by means including a holding device of the actuating mechanism, which device comprises a lever that is operatively connected via a relay lever with the movable stop of the additional spring. The stop, upon being released, strikes against either the relay lever or a supporting lever pivoted on the latter and adapted to be brought into its adjustment position by a setting means, thereby releasing the holding device.

For cooperation with a flash gun, a flash contact device can be associated with the actuating mechanism of the shutter in accordance with the invention.

Details of the invention can be noted from the following description and the drawing which shows one embodiment of the subject matter of the invention.

In the drawings:

FIG. 2 is a similar partial view of the between-the-lens shutter with the drive mechanism half run down and the shutter blades in open position;

FIG. 5 shows the flash contact device in a view similar to FIG. 3, but at the moment when contact was made on the X-contact switch with the shutter half run down;

FIG. 6 is a side view of the X-contact switch seen in the direction of the arrow of FIG. 5;

Figure 1:
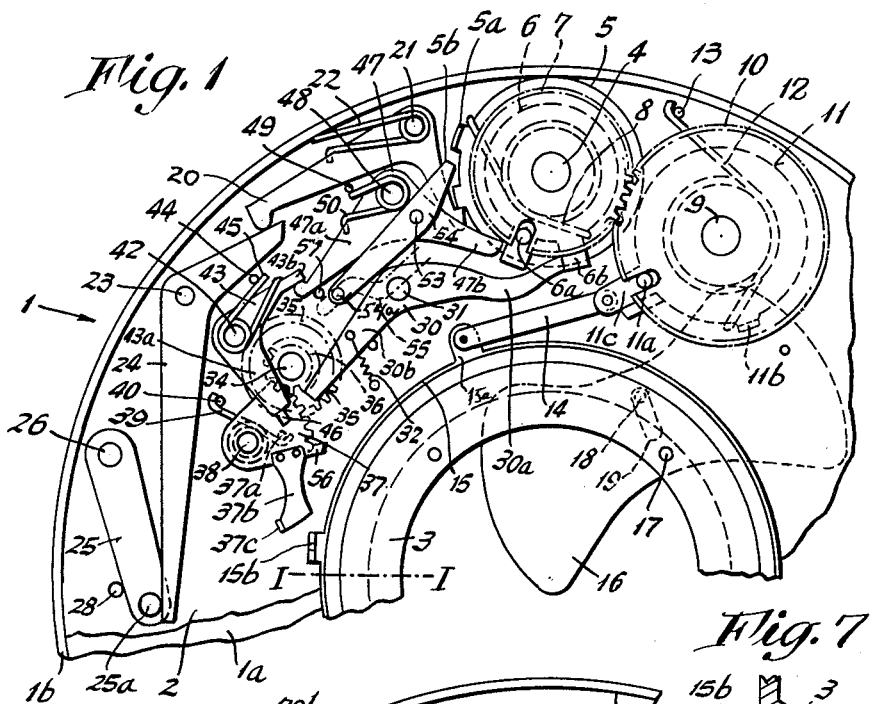
FIG. 1 shows the between-the-lens shutter of the invention in a partial top view in cocked condition, the shutter blades being in closed position.
Figure 7:
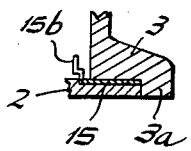
FIG. 7 is a cross-section through the front tube support along the sectional line I—I shown in FIG. 1.

Referring to the drawing, the housing 1 of a photographic between-the-lens shutter consists of a cylindrical outer wall 1b, a rear wall 1a and a rear tube support (not shown in the drawing) for attachment of the between-the-lens shutter to the camera housing. A shutter base plate 2 is fastened to the housing 1, and on this plate there is seated a front tube support 3 which serves to receive the lens. This front tube support is rigidly connected in known manner with the base plate 2, for instance by means of a plurality of screws which have not been shown in detail in the drawing, in order not to clutter it.

A cocking shaft 4, one end of which is extended out of the rear wall 1a of the shutter housing 1, is rotatably supported in the base plate 2, and it has a disk 5 arranged rotatably on it, together with another disk 6. The latter is connected in form-locked manner, for instance by a pin 6a, with a gear 7 fixed for rotation on the cocking shaft 4. Between the two disks 5 and 6, and wound around the shaft 4, is a coil spring 8, each of the ends of which has a bend. By means of these bends, the coil spring 8, which serves as an additional spring for the shutter drive, is so supported at one end on the stop lug 5a of the disk 5 and on the other end on a similarly axially directed lug 6b of the disk 6 that upon relative rotation of the disk 5 with respect to the disk 6, the spring is cocked. Rotatably supported on an adjacent shaft 9 is another gear 10, which meshes with the gear 7. A disk 11, also seated on the shaft 9, is in form-locked connection with the gear 10 by means of a pin 11a. One end of coil spring 12, which is wound around the shaft 9, engages a lug 11b of the disk 11, and the other end rests against a stationary pin 13 on the base plate 2. Depending on the adjustment of the exposure-time setting means of the shutter (which is known per se, and therefore not shown in detail), the gear 11 can be driven either solely by the spring 12, which acts as mainspring, or else, in order to obtain a particularly short exposure time of, for instance, 1/1000 second, by the spring 12 together with the aforementioned additional spring 8. This furthermore is dependent on the position of a member 54 which cooperates with the exposure-time setting means and with the disk 5, and which will be described in further detail below. The purpose of this member is either to allow the disk 5 to run until the additional spring 8 is relaxed, or else to keep it in a position in which its cocking force is retained. For this purpose, there is provided on the disk 5, a lug 5a which is developed as a stop and the outer end of which is bent off laterally.

As can be noted from FIGS. 1 and 2, the disk 11 has a lug 11c which serves as crank arm. With this lug, there is pivotally connected a driving member in the form of a push rod 14, the other end of which engages a ring 15 which is rotatably supported on a cylindrical extension 3a of the front tube support 3 and is provided with a stop or lug 15a. This ring serves for the driving of the shutter blades 16, only one of which has been shown for purposes of simplicity in the drawing. The shutter blades 16 which swing continuously in one direction upon the running down of the shutter are each pivotally supported by means of a pin 17 on the bottom of the base plate 2, while they are in driving connection with the drive ring 15 by means of a pin-slot connection 18 and 19.

In order to be able to hold the drive mechanism 5 to 13, which is formed essentially of the additional and mainsprings 8 and 12, the disk 5 and the two gears 7 and 10, in its cocked position shown in FIG. 1, there is provided a detent lever 20 which acts on a lug 5b of the abutment or the disk 5. The lever 20 is in the form of a bell-crank lever in the embodiment shown and is held in latching position by the force of a spring 22, which urges the lever counterclockwise about a shaft 21. With the detent lever 20, there is associated a 2-armed intermediate lever 24 which is also pivotally supported on a shaft 23. The intermediate lever in its turn engages a release lever 25 which is operatively connected with the camera release trigger (not shown). The release lever 25 is fixed for rotation on a shaft 26 and has, on its free end, a pin 25a which lies in the plane of movement of the intermediate lever 24. A stop pin 28 limits the rotation of the lever 25 in the clockwise direction.

While the disk 5, as set forth above, is held fast in the cocked position by a detent lever 20, which is actuatable by means of the camera release and can hook itself on the lug 5b, a double-armed locking lever 30 serves to support the disk 6 of the gear 7 which takes up the cocking moment of the additional and mainsprings 8 and 12. The lever 30 is pivotally supported on a stationary shaft 31 and is so arranged with respect to the disk 6 that its lever arm 30a, which cooperates with the latter, extends in locking position approximately tangentially into the path of movement of the lug 6b provided on the disk 6. The other arm 30b of the locking lever 30 is pulled counterclockwise by a return spring 32 to hold the lever in its cocked position.

In addition to the drive mechanism 5 to 13, the shutter of this invention may include an actuating mechanism, or means to cooperate therewith, which can be cocked and run down before the running down of the shutter. This actuating mechanism includes, in the embodiment shown by way of example, a shaft 34 on which gear 35 is rotatably mounted, together with a pinion 36 that is affixed to the gear 35. A segment gear 37 pivotally supported on a shaft 38 meshes with the pinion and is urged counterclockwise by means of a coil spring 39. At one end this spring engages on a pin 37a of the segment gear, while on the other end it hooks onto a stationary pin 40. Furthermore, this pin is also so arranged that it is under tension when the segment gear 37 is in the end position shown in FIG. 1, in which position a torque in counterclockwise direction is exercised on the segment gear.

In order to be able to hold the segment gear 37 in its cocked position, a holding device is provided. It may consist, for instance, of a bell-crank lever 43 pivotally supported on a stationary shaft 42. A coil spring 45, which acts on said lever and rests at one end against a stationary pin 44 in the base plate 2 serves to hold the lever 43 in its locked position. The spring 45 for this purpose acts on the lever 43 in such a manner that the spring always exerts on it a moment directed in clockwise direction, while the arm 43a facing the segment gear 37 engages in blocking fashion into the path of movement of a stop 46 arranged thereon.

The other arm 43b of the lever 43 cooperates with a relay lever 47 which in the embodiment shown in FIGS. 1 and 2 is a double-armed lever and is pivotally supported on a shaft 48. With the relay lever 47, there is associated a coil spring 50 which rests on a stationary pin 49 and strives to turn it constantly in clockwise direction around its shaft 48. A stop pin 51 lying in the path of movement of the arm 47a of the relay lever 47 serves to take up this torque. While the arm 47a of the relay lever 47 cooperates with the arm 43b of the lever 43, the outermost end of its other arm 47b extends into the circular path of movement of the stop 5a of the disk 5.

As can be noted from the drawing, a latch in the form of a lever 54 is pivotally supported by a pin 53 on the arm 47b of the relay lever 47. The latch 54 bears at its one end a pin 54a which engages into a control slot (indicated by dot-dash lines) of the exposure time setting means not shown in further detail in the drawing. The latch 54 is so shaped and located that its free end can engage with the stop 5a of the disk 5. Depending on the adjustment of the exposure-time setting means, the latch 54 must be able to assume two different positions. One adjustment position is to cover the range of one second to 1/500 second, in connection with which the outer end of latch 54 is outside the path of movement of the stop 5a, and another adjustment setting position is to cover the highest operational speeds of the shutter, for example, for an exposure time of 1/1000 second, in which the outer end of latch 54 is in the path of movement of the stop. This can be obtained by a corresponding shaping of the control slot 55, as indicated, for example, by dot-dash lines in FIGS. 1 and 2. For the release of the drive mechanism 5 to 13, there is an extension 56 arranged on the arcuate part of the segment gear 37 and cooperating with the arm 30b of the locking lever 30 in such a manner that at the end of the running-down of the actuating mechanism 34 to 39, this extension strikes against the arm 30b of the locking lever 30, and swings the latter in clockwise direction around the shaft 31 against the action of its return spring 32.

In order to be able to bring the actuating mechanism 34 to 39, together with the drive mechanism 5 to 13, into cocked position upon the cocking of the shutter, means are provided which make this joint operation possible. For this purpose, the shutter-blade drive ring 15 has a hook 15b, as can be noted in particular from FIGS. 5 and 6, which cooperates with an arm 37b that is somewhat resilient in the direction transverse to its direction of movement, and protrudes laterally from the segment gear 37. On its free end, the arm 37b has an upward-directed edge 37c, as can be noted in particular from FIGS. 4 and 5.

In FIGS. 3 to 6, there is shown a flash-contact device serving for the igniting of either an electronic or a bulb flash device and which can be switched as desired to M- and X-synchronization. Furthermore, this device can be controlled in accordance with the running-down of the actuating mechanism 34 to 39, the construction of which has already been described above. In detail, the flash contact device comprises both an M-contact switch and an X-contact switch. The latter consists essentially of two contact arms 59 and 60, fastened alongside of each other by screws or rivets 58 on the base plate 2. Of these two contact arms, the one designated 59 is developed as an electric conductor, and for this purpose is insulated from the base plate 2, while the contact arm 60 serves as ground element. The shape and arrangement of the two contact arms 59 and 60 which are connected at one end with the base plate 2 is so selected that their two free ends 59a and 60a lie at a certain distance one directly above the other at a common place. This common place, in its turn, agrees geometrically with the place where the free end of the spring arm 37b remains after the running down of the segment gear 37. This can be noted, in particular from FIG. 6, as well as the fact that the contact place is in the path of movement of the driver 15b of the shutter drive ring 15.

For the M-contact switch an electrically conductive metal strip 63 having a contact surface 63a is fastened in insulated manner by screws or rivets 62 to the base plate 2. The contact arm 60 of the X-contact switch serves as ground element, and has for this purpose a tongue 60a, the end of which is opposite the contact surface 63a of the electric conductor 63. The actuation of the M-contact switch is effected by means of a double-arm U-shaped lever 64, which is pivotally supported on a stationary shaft 65 of the base plate 2 and is under the influence of a coil spring 66 that urges it in the counter-clockwise direction around its shaft 65. Aside from this spring, another leaf spring 67, fastened to the actuating lever 64, acts on the lever, the free end 67a of the spring resting, when the shutter is in cocked position, against the lug 15a of the drive ring 15 and thus exerting on it a torque to the clockwise direction. This torque is greater than the oppositely directed torque of the coil spring 66, but is only present when the drive ring is in cocked position. In order to take up the residual torque which results from this, the end of the actuating lever 64 facing the M-contact switch occupies, in cocked position of the shutter (as can be noted in particular from FIG. 3), against the stop 46 of the segment gear 37.

The arm 64a of the actuating lever 64 furthermore has a stop lug 64b which cooperates with the tongue 60a of the ground element 60. For shifting of the flash contact device from X- to M-synchronization, a setting device 70 is employed as indicated in dashed lines in FIGS. 3 and 5. It, in its turn, is provided with a pointer 70a, which indicates whether the flash contact device is set at X- or at M-synchronization. The setting device 70 furthermore bears a stop lug 70b. Upon the setting of the flash contact device to X-synchronization, the lug 70b prevents the actuating lever 64 from rotating in clockwise direction under the influence of the spring 67 and thus actuating the M-contact prematurely.

The manner of operation of the shutter arrangement in accordance with the invention is as follows:

If, in accordance with the position of the shutter shown in FIG. 1 for the obtaining of an exposure time of for instance 1/1000 second, the camera release is actuated, the detent lever 20 which is in operative connection with the latter via the levers 24 and 25 frees the disk 5 of the drive mechanism 5 to 13 so that it can rotate or run down. The stop 5a of the disk 5 strikes against the latch 54 which, on the one hand, prevents the disk from rotating further, and on the other hand, due to the kinetic energy imparted to the disk by the cocking moment of the coil spring 8, drives the relay lever 47 and swings it about its shaft 48. As a result of this, the holding device 43 is moved out of its blocked position, and the transport mechanism 34 to 39 is thereupon freed to operate. At the end of the operation of the transport mechanism, the nose 56 of the segment gear 37 strikes against the arm 30b of the locking lever 30, and carries the latter along against the action of its return spring 32, thus unlocking the lug 6b of the disk 6 and releasing the drive mechanism 5 to 13 for the running-down, or operation, of the shutter blades 16.

Under the influence of both the additional spring 8 and the mainspring 12, the gears 7 and 10 now rotate around their shafts 4 and 9, respectively. In this connection, the gear 10 rotates counterclockwise, pulling the driving member 14 with it so that the drive ring 15 is simultaneously carried along. The ring 15, in turn, pivots the shutter blades 16 from the closed position via the open position back into the closed position. While during the process described above the driver 15b, arranged on the drive ring 15, passes without being substantially impeded past the spring arm 37b of the segment gear 37, the latter, as indicated in dot-dash lines in FIG. 4, hooks on the spring arm during the subsequent cocking process, so that the transport mechanism is brought, together with the drive mechanism, into cocked position.

In order to obtain a longer exposure time, for instance of 1/500 second, the exposure-time setting device is shifted. By this shifting, the latch 54 is again moved out of the path of movement of the stop 5a of the disk 5. If the disk 5 is now permitted to run down in the manner described above by the swinging of the detent lever 20, the stop 5a, at the end of its rotary movement, comes against the arm 47b of the relay lever 47, as shown in FIG. 2. As a result of this, the holding device 43 is moved via the arm 47a of the relay lever 47 out of its locked position, the holding device in its turn allowing the actuating mechanism 34 to 39, as well as the drive mechanism 5 to 13 to run down in the same manner as already described. When the shutter is so operated, only the mainspring 12 comes into action since the additional spring 8 has been completely relaxed, that is, its stored energy is substantially completely dissipated, upon the running down of disk 5.

Figure 3:
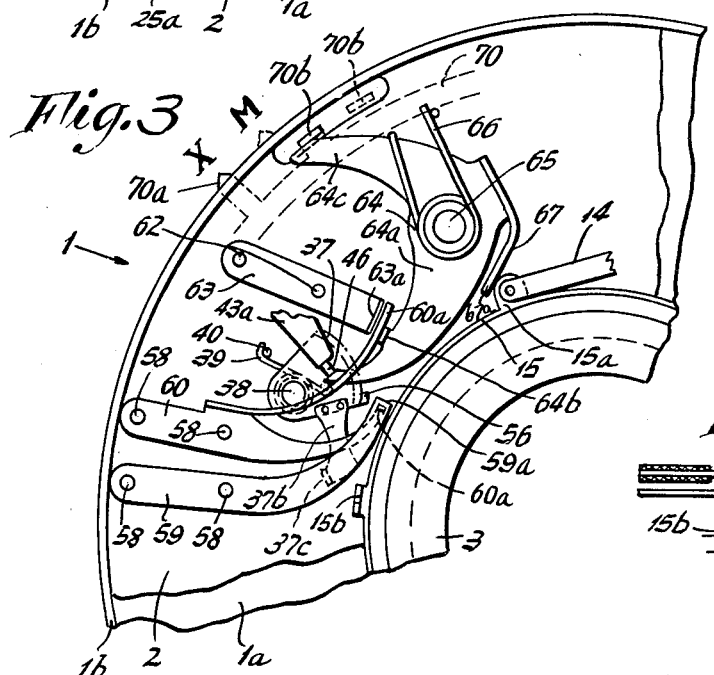
FIG. 3 shows the flash-contact device, switchable to M and X-synchronization, of the between-the-lens shutter in a position which this device assumes before the release of the shutter.
Figure 4:
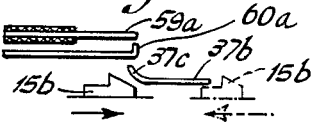
FIG. 4 is a side view of the X-contact switch directly before the making of contact, the final position of the part which produces the contact being indicated in dot-dash lines.

If flash photographs are to be taken with the shutter described above, using a flash gun, whether an electronic flash or a bulb flash, the flash contact device shown in FIGS. 3 to 5, and described above, is to be set either to X- or to M-synchronism, depending on the type of flash used. When using an electronic flash the X-synchronization is used, as shown in FIGS. 3 and 5, and contact is made by the driver 15b which, upon the running down of the drive ring 15, passes below the spring arm 37, and slightly raises the latter and thus brings the contact arm 60 against the contact arm 59, as can be noted from FIG. 6. The moment in which contact is made is so timed with respect to the opening and closing movements of the shutter blades 16 that the flash gun lights up when the shutter blades are fully open.

Upon shifting the flash contact device to M-synchronization for the use of a bulb flash, the stop lug 70b is moved into the position shown in dot-dash lines in FIGS. 3 and 5. In this way, once again the condition exists that the actuating lever 64 at the moment when the segment gear 37 enters into movement for the running down of the actuating mechanism 34 to 39 is swung in clockwise direction under the action of its spring 67, following the stop 46 of the segment gear. As a result of this rotation of the actuating lever 64, the tongue 60a of the contact switch 60 is brought into contact with the contact surface 63a of the M-contact switch, and thus the firing of the flash bulb is brought about. The full luminescent power is reached by a flash bulb, as is known, only after the passage of a certain period of time, which period of time is bridged in the case of the shutter of the invention by the running down of the actuating mechanism 34 to 39.

Variations and modifications may be made without departing from the spirit of the invention or the scope of the appended claims.

We claim:

1. A photographic shutter comprising a shutter blade; a driving mechanism for actuating said blade, said mechanism comprising a driving member operatively connected to said blade, a main spring to move said member at a controllable speed, an additional spring, first means connecting said additional spring to said member to increase the speed of movement thereof, and a second member engaging said additional spring to store energy therein by holding said additional spring when said shutter is cocked; a lock engageable with said second member to hold it in cocked position; a shutter release trigger connected to said lock to release said second member when a photographic exposure is to be made; a second lock engageable with said first means to maintain both said springs in cocked position until said shutter release trigger is actuated to make an exposure; third means operatively engageable with said second member to release said second lock in response to movement of said second member upon release of said first lock; and control means to determine the location occupied by said second member when the latter engages said third means, whereby said second lock may be released before the stored energy in said additional spring has been dissipated if the highest speed of movement of said blade is desired, or said second lock may be released after the stored energy in said additional spring has been released, if a lower speed of movement of said blade is desired.

2. A photographic shutter comprising a shutter blade; a driving mechanism for actuating said blade, said mechanism comprising a driving member operatively connected to said blade, a main spring to move said member at a controllable speed, an additional spring, a second member engaging said adidtional spring to hold said additional spring to store energy therein when said shutter is cocked, and first means connecting said additional spring to said main spring and to said driving member to increase the speed of movement of the latter; a lock engageable with said second member to hold it in cocked position; a shutter release trigger connected to said lock to release said second member when a photographic exposure is to be made; a second lock engagable with said first means to maintain both said springs in cocked position until said shutter release trigger is actuated to make an exposure; third means operatively engageable with said second member to release said second lock in response to movement of said second member upon release of said first lock; and control means to determine the location occupied by said second member when the latter engages said third means, whereby said second lock may be released before the stored energy in said additional spring has been dissipated, if the highest speed of movement of said blade is desired, or said second lock may be released after the stored energy in said additional spring has been released, if a lower speed of movement of said blade is desired.

3. A photographic shutter comprising a shutter blade; a driving mechanism for actuating said blade, said mechanism comprising a driving member operatively connected to said blade, a main spring to move said member at a controllable speed, an additional spring, a second member engaging said additional spring to hold said additional spring to store energy therein when said shutter is cocked, and first means comprising a pair of interconnected members connecting said additional spring to said main spring and to said driving member to increase the speed of movement of the latter; a lock engageable with said second member to hold it in cocked position; a shutter release trigger connected to said lock to release said second member when a photographic exposure is to be made; a second lock engageable with said first means to maintain both said springs in cocked position until said shutter release trigger is actuated to make an exposure; third means operatively engageable with said second member to release said second lock in response to movement of said second member upon release of said first lock; and control means to determine the location occupied by said second member when the latter engages said third means, whereby said second lock may be released before the stored energy in said additional spring has been dissipated, if the highest speed of movement of said blade is desired, or said second lock may be released after the stored energy in said additional spring has been released, if a lower speed of movement of said blade is desired.

4. A photographic shutter comprising a shutter blade; a driving mechanism for actuating said blade, said mechanism comprising a driving member operatively connected to said blade, a main spring to move said member at a controllable speed, an additional spring, a second member engaging said additional spring to hold said additional spring to store energy therein when said shutter is cocked, and first means comprising a pair of meshed gears connecting said additional spring to said main spring and to said driving member to increase the speed of movement of the latter; a lock engageable with said second member to hold it in cocked position; a shutter release trigger connected to said lock to release said second member when a photographic exposure is to be made; a second lock engageable with said first means to maintain both said springs in cocked position until said shutter release trigger is actuated to make an exposure; third means operatively engageable with said second member to release said second lock in response to movement of said second member upon release of said first lock; and control means to determine the location occupied by said second member when the latter engages said third means, whereby said second lock may be released before the stored energy in said additional spring has been dissipated, if the highest speed of movement of said blade is desired, or said second lock may be released after the stored energy in said additional spring has been released, if a lower speed of movement of said blade is desired.

5. A photographic shutter comprising a shutter blade; a driving mechanism for actuating said blade, said mechanism comprising a driving member operatively connected to said blade, a main spring to move said member at a controllable speed, an additional spring, a second member engaging said additional spring to hold said additional spring to store energy therein when said shutter is cocked, and first means connecting said additional spring to said main spring and to said driving member to increase the speed of movement of the latter; a lock engageable with said second member to hold it in cocked position; a shutter release trigger connected to said lock to release said second member when a photographic exposure is to be made; a second lock engageable with said first means to maintain both said springs in cocked position until said shutter release trigger is actuated to make an exposure; third means operatively engageable with said second member to release said second lock in response to movement of said second member upon release of said first lock; and control means to determine the location occupied by said second member when the latter engages said third means, said control means comprising an abutment on said second member, and a third member movable into the path of said abutment and operatively connected with said third means, whereby when said third member is in the path of movement of said abutment, said abutment strikes said third member before the energy stored in said additional spring has dissipated and releases said second lock to permit said main spring and said additional spring to unwind together to move said driving member at its highest speed, and when said third member is out of the path of movement of said abutment, said abutment strikes said third means and releases said second lock after the energy stored in said additional spring has dissipated.

6. A photographic shutter comprising a shutter blade; a driving member to move said blade; a main spring operatively connected to said driving member; an additional spring; first means to connect said additional spring to said main spring to add the resilient forces of both said springs together to cause said driving member and said blade to move relatively rapidly; a disk connected to one end of said additional spring; a first lock engaging said disk to hold it fixed while said shutter is cocked; a shutter release trigger to release said lock when it is desired to make a photographic exposure; rotatable means holding the other end of said additional spring; a second lock holding said rotatable means fixed after said shutter has been cocked; an actuating mechanism comprising a resiliently biased gear; second means holding said actuating mechanism stationary after said shutter has been cocked; third means engaging said second means and being actuated by rotation of said disk after said first lock has been released to permit said actuating mechanism to operate, said transport mechanism comprising means to release said second lock after said actuating mechanism has substantially completed its operation; fourth means connecting said rotatable means to said main spring to permit said main spring to move said driving member only after said second lock has been released; and means for setting said third means to be actuated, alternatively, before the energy stored in said additional spring has been substantially completely dissipated if it is desired to add the forces of said springs together or after the energy stored in said additional spring has been substantially completely dissipated if it is desired to cause said driving member and shutter blade to move at a comparatively slower speed under the force of said main spring alone.

7. A photographic shutter comprising a shutter blade; a driving member to move said blade; a main spring operatively connected to said driving member; an additional spring; first means to connect said additional spring to said main spring to add the resilient forces of both said springs together to cause said driving member and said blade to move relatively rapidly; a disk connected to one end of said additional spring; a first lock engaging said disk to hold it fixed while said shutter is cocked; a shutter release trigger to release said lock when it is desired to make a photographic exposure; rotatable means holding the other end of said additional spring; a second lock holding said rotatable means fixed after said shutter has been cocked; an actuating mechanism comprising a resiliently biased gear; second means holding said actuating mechanism stationary after said shutter has been cocked; third means engaging said second means and being actuated by rotation of said disk after said first lock has been released to permit said actuating mechanism to operate, said actuating mechanism comprising means to release said second lock after said actuating mechanism has substantially completed its operation; fourth means connecting said rotatable means to said main spring to permit said main spring to move said driving member only after said second lock has been released; means for setting said third means to be actuated, alternatively, before the energy stored in said additional spring has been substantially completely dissipated if it is desired to add the forces of said springs together or after the energy stored in said additional spring has been substantially completely dissipated if it is desired to cause said driving member and shutter blade to move at a comparatively slower speed under the force of said main spring alone; and means operatively engaging said actuating mechanism during cocking of said shutter to cock said actuating mechanism at the same time that said main spring and said additional spring are cocked.

8. A photographic shutter comprising a plurality of pivotally mounted shutter blades; a ring operatively connected to all of said blades to pivot them through their range of movements; a main spring operatively connected to said driving member; an additional spring; first means to connect said additional spring to said main spring to add the resilient forces of both said springs together to cause said ring and said blades to move relatively rapidly; a disk connected to one end of said additional spring; a first lock engaging said disk to hold it fixed while said shutter is cocked; a shutter release trigger to release said lock when it is desired to make a photographic exposure; rotatable means holding the other end of said additional spring; a second lock holding said rotatable means fixed after said shutter has been cocked; an actuating mechanism comprising a resiliently biased gear; second means holding said actuating mechanism stationary after said shutter has been cocked; third means engaging said second means and being actuated by rotation of said disk after said first lock has been released to permit said actuating mechanism to operate, said actuating mechanism comprising means to release said second lock after said actuating mechnaism has substantially completed its operation; fourth means connecting said rotatable means to said main spring to permit said main spring to move said driving member only after said second lock has been released; means for setting said third means to be actuated, alternatively, before the energy stored in said additional spring has been substantially completely dissipated if it is desired to add the forces of said springs together or after the energy stored in said additional spring has been substantially completely dissipated if it is desired to cause said driving member and shutter blades to move at a comparatively slower speed under the force of said main spring alone; and means connected to said ring to cock said actuating mechanism when said ring rotates in the reverse direction in response to reverse pressure of said driving member when said main spring and said additional spring are cocked.

9. A photographic shutter comprising a shutter blade; a driving member to move said blade; a main spring operatively connected to said driving member; an additional spring; first means to connect said additional spring to said main spring to add the resilient forces of both said springs together to cause said driving member and said blade to move relatively rapidly; a disk connected to one end of said additional spring; a first lock engaging said disk to hold it fixed while said shutter is cocked; a shutter release trigger to release said lock when it is desired to make a photographic exposure; rotatable means holding the other end of said additional spring; a second lock holding said rotatable means fixed after said shutter has been cocked; a actuating mechanism comprising a resiliently biased gear; second means holding said actuating mechanism stationary after said shutter has been cocked; a first lever positioned adjacent to said disk to be actuated by rotation thereof near the end of said rotation after said first lock has been released, a second lever pivotally mounted on said first lever and positionable to engage said disk near the beginning of rotation thereof to halt said rotation whereby said first lever will be actuated near the beginning of the rotation of said disk, said first lever engaging said second means to release it upon actuation of said first lever, thereby permitting said actuating mechanism to operate, said actuating mechanism comprising means to release said second lock after said actuating mechanism has substantially completed its operation; additional means connecting said rotatable means to said main spring to permit said main spring to move said driving member only after said second lock has been released; and control means for positioning said second lever to engage said disk.

10. A photographic shutter comprising a shutter blade; a driving member to move said blade; a main spring operatively connected to said driving member; an additional spring; first means to connect said additional spring to said main spring to add the resilient forces of both said springs together to cause said driving member and said blade to move relatively rapidly; a disk connected to one end of said additional spring; a first lock engaging said disk to hold it fixed while said shutter is cocked; a shutter release trigger to release said lock when it is desired to make a photographic exposure; rotatable means holding the other end of said additional spring; a second lock holding said rotatable means fixed after said shutter has been cocked; an actuating mechanism comprising a resiliently biased gear; second means holding said actuating mechanism stationary after said shutter has been cocked; third means engaging said second means and being actuated by rotation of said disk after said first lock has been released to permit said actuating mechanism to operate, said actuating mechanism comprising means to release said second lock after said actuating mechanism has substantially completed its operation; additional means connecting said rotatable means to said main spring to permit said main spring to move said driving member only after said second lock has been released; control means for setting said third means to be actuated, alternatively, before the energy stored in said additional spring has been substantially completely dissipated if it is desired to add the forces of said springs together or after the energy stored in said additional spring has been substantially completely dissipated if it is desired to cause said driving member and shutter blade to move at a comparatively slower speed under the force of said main spring alone; electric flash contact terminals; and means on said actuating mechanism for operating said contact terminals after said actuating mechanism has substantially completed its operation.

References Cited in the file of this patent
UNITED STATES PATENTS 2,925,024   Junghans _____ Feb. 16, 1960
3,014,418   Hahn _____ Dec. 26, 1961